United States Patent [19]

Veach et al.

[11] Patent Number: 4,964,376

[45] Date of Patent: Oct. 23, 1990

[54] DEVICE FOR BYPASSING HEAT EXCHANGE CONDUITS

[75] Inventors: Jack R. Veach, Maple Plane; Alden C. Helleksen, Mound, both of Minn.

[73] Assignee: Arctic Fox Heaters, Hopkins, Minn.

[21] Appl. No.: 420,601

[22] Filed: Oct. 3, 1989

[51] Int. Cl.⁵ ............................................. F02M 31/16
[52] U.S. Cl. ............................. 123/557; 123/142.5 R; 123/540; 165/35; 165/51; 165/74; 165/132; 236/99 K; 137/625.48; 220/85 R
[58] Field of Search .................... 165/35, 132, 74, 51; 123/557, 142.5 R, 540; 236/99 K; 137/625.48; 220/85 R, 85 P

[56] References Cited

U.S. PATENT DOCUMENTS

| | | | |
|---|---|---|---|
| 461,981 | 10/1891 | Miles | 137/625.48 |
| 1,835,323 | 12/1931 | Olson et al. | 165/74 |
| 2,545,966 | 3/1951 | McQuitty | 165/74 |
| 3,353,590 | 11/1967 | Holman | 165/35 |
| 3,398,891 | 8/1968 | Horne | 165/35 |
| 3,730,260 | 5/1973 | Raymond | 165/74 |
| 4,237,850 | 12/1980 | Connor et al. | 123/557 |
| 4,286,551 | 9/1981 | Blitz . | |
| 4,338,891 | 7/1982 | Blitz | 165/74 |
| 4,351,301 | 9/1982 | Allen | 123/557 |
| 4,393,851 | 7/1983 | Gorans . | |
| 4,401,091 | 8/1983 | Costello et al. . | |
| 4,434,773 | 3/1984 | Granetzke . | |
| 4,748,960 | 6/1988 | Wolf | 123/557 |

OTHER PUBLICATIONS

Reference in "Fleet Owner" magazine, p. 114, Jan. 1988, to a coolant-shutoff valve.

Primary Examiner—John Ford
Attorney, Agent, or Firm—Merchant, Gould, Smith, Edell, Welter & Schmidt

[57] ABSTRACT

A system for controlling the heating of diesel fuel in a fuel tank of a diesel engine system to prevent diesel engine control electronics damage. The system is operable to bypass heat exchange medium flow at predetermined temperature ranges to prevent further heating of diesel fuel in a diesel fuel reservoir tank by the heat exchange medium. More particularly, this mechanically operated system permits identical temperature control means for controlling various temperatures of hydraulic oil in hydraulic oil reservoir tanks. The system may also be utilized to facilitate flow of a heat exchange medium which cools fluid in either diesel fuel or hydraulic oil reservoir tanks.

35 Claims, 2 Drawing Sheets

DEVICE FOR BYPASSING HEAT EXCHANGE CONDUITS

This is a continuation-in-part, of application Ser. No. 07/156,349, filed Feb. 16, 1988 now abandoned.

FIELD OF THE INVENTION

The present invention relates generally to a system for controlling the temperature of diesel fuel and hydraulic oil reservoirs. More particularly, this invention concerns a temperature responsive mechanical manifold which automatically bypasses a heating or cooling heat exchange medium from flow in heat exchange conduits in reservoir tanks.

BACKGROUND OF THE INVENTION

Diesel fuel, particularly No. 2 fuel oil, has the tendency to gel or "wax" in cold weather. This gelling of diesel fuel is a particularly acute problem in the trucking industry during colder months in portions of the U.S., Canada, and Europe. During the winter months, temperatures and wind chill factors frequently reach minus 30° Fahrenheit in these areas. In such a temperature and windchill range, diesel fuel tends to gel or wax both in the fuel tank itself and within a fuel line leading from the tank to the engine. In the severest instances of gelling, the diesel engine completely fails. The truck or other vehicle thus must be towed to a service area and the fuel system heated. The towing and down time of the truck results in increased transportation cost. In less severe instances, the gelling can result in loss of power so that the trucks are forced to travel at a slow rate of speed. This also results in increased transportation cost.

Similar cold weather problems exist with the use of hydraulic oil. Typically, hydraulic oils of various grades experience viscosity changes dependent on temperature. In cold weather or winter months, hydraulic oil which is cold provides slower response times to the equipment it is powering. Moreover, cold hydraulic oil may cause: pump damage from cavitation; slower operation from hydraulic motors; high pressure leaks; blown hose ends; blown seals; and other problems. Often it is necessary to warm the hydraulic oil reservoir prior to powered operation of equipment to avoid improper operation.

Problems also exist when diesel fuel or hydraulic oil is warmer than an optimum operating range. In the case of diesel fuel, optimal operating temperatures may range generally between about 60° F. and about 110° F., subject to quality of the diesel fuel, additives therein, and other considerations. Frequently, diesel fuel in trucks and vehicles operating in warmer climates or for long durations produce heating effects within the engines that cause the fuel temperature to exceed the optimum power ranges. This overheating may result in numerous problems, including damage to electronic components in engine systems. Therefore, it is desirable to reduce the amount of heat in the fuel in such situations. Similarly, when hydraulic oil is warmed beyond an optimum range, power control problems and residual heating effects may occur. It is therefore desirable to reduce the amount of heat in hydraulic oil reservoirs when the temperature of such reservoirs exceeds a predetermined range.

Numerous methods and apparatus have been used in the past in an attempt to solve these or related problems. A temperature controlling system for use with a fluid cooled internal combustion engine of an automotive transport system, during periods when the combustion engine is not in operation, is provided in U.S. Pat. No. 4,286,551 issued to James E. Blitz on Sept. 1, 1981. The device disclosed in the Blitz patent includes a manually operated three-way cut-off valve and bypass conduit means permitting fluid coolant to be optionally diverted from passage through the internal combustion engine, heated and pumped in response to a power source and temperature sensing means through pipe coils and conduit means located in relation to an automotive transport diesel storage vessel or automotive transport hydraulic unit storage vessel.

Another method is disclosed in U.S. Pat. No. 4,237,850 issued to Frank G. Connor and Billy B. R. Veach on Dec. 9, 1980. The Connor et al "System for Heating Fuel Oil" patent is substantially similar to portions of, and is owned by, the assignee of the present applicants. However, the device disclosed in the Connor et al patent is substantially improved with addition of the manifold device disclosed in the present application to selectively bypass heat exchange medium from flowing through the heat exchange conduits of the Connor device. Moreover, a manifold device in cooperation with the Connor device permits heating, cooling, or bypassing of the heat exchange conduits.

A diesel fuel temperature controlling apparatus is also disclosed in U.S. Pat. No. 4,393,851 issued to Marc S. Gorans. The Gorans patent includes a thermostatic valve means for modulating the flow of diesel fuel through passageways in response to temperature of unmixed and unheated bypassed fuel. Similarly, a valve controlled fuel heater with self-adjusting valves is disclosed in U.S. Pat. No. 4,434,773 issued to Dennis C. Granstake, in which a temperature responsive valve body is movable between a first extreme position for directing fuel through a path of heat receiving relationship with a heater means when the fuel temperature is cold, and a second extreme position that directs the fuel to bypass the heater means when the fuel is hot.

In many of these prior systems, disadvantages exist. For example, most systems do not provide temperature sensing means which are placed directly into a fuel or oil reservoir tank bottom and therefore do not accurately sense a temperature of fuel or oil therein. Further, many prior art systems provide means for bypassing flow of fuel in response to various pressure/temperature sensing means rather than improved regulation of a heat exchange medium flow. Moreover, prior art systems do not typically permit continuous flow heat exchange loops during all phases of operation of a vehicle, truck, or other equipment in which the system is functioning. A continuous flow loop during all phases of operation is particularly desirable in cooperation with preheating or precooling devices, as well as pumping means.

Frequently, fuel and oil heating devices do not adequately safeguard electronic components now more prevalent within the control systems of engines. This in itself creates various problems. Overheating of electronic components in engine control systems often results in failure of those components. A secondary effect of failure of engine control components may be substantial damage to the engine, or at least a significant degradation in engine operation.

Other disadvantages of present day diesel fuel and hydraulic oil temperature control devices include: electrical components which may cause significant maintenance problems; valves which must be manually operated to effect bypass conditions; inefficient placement of heat exchange conduits in relation to the diesel fuel and/or hydraulic oil; difficulty in installation; and, numerous components requiring substantial supply and repair concerns. Other present day systems do not provide devices which may be configured for either heating or cooling purposes using virtually interchangeable parts, while other systems are not optimally located on the top portions of diesel fuel and/or hydraulic oil reservoirs. In such systems, adaptability to operation in various climates is often impractical.

What has been needed has been an improved system for bypassing heat exchange medium flow: providing an easily installed and readily adaptable system for warm weather or cold weather operations; providing means for temperature sensing of diesel fuel or hydraulic oil actually within the respective reservoirs; providing for continuous loop heat exchange medium flow when the system is in a bypassed mode; providing means for warming or cooling fuel oil when that oil is being drawn into a fuel line from a diesel fuel reservoir; providing a non-electrical, completely mechanical actuator means for operating the manifold device, thereby permitting more reliable operation. Also, a diesel fuel and hydraulic oil reservoir heating and cooling system which is relatively inexpensive to manufacture and is easily installed is preferred.

Objects and advantages of the present invention in achieving these and other goals will become apparent from the following descriptions, taken in connection with the accompanying drawings, wherein are set forth by way of illustration and example certain embodiments of the present invention.

SUMMARY OF THE INVENTION

A system is provided to control the flow of a heat exchange medium through heat exchange conduits positioned in a reservoir tank of fluids. More specifically, the system is operable to assist in the automatic bypassing of heat exchange medium flow from entering heat exchange conduits in a reservoir tank for diesel fuel or hydraulic oil. The system is particularly well suited for these two fluids due to the recognized need to maintain these fluids within predetermined ranges of temperature. This is, either of these fluids at temperatures beyond the predetermined ranges experience undesirable characteristics which effect operation of vehicles, engines, and other equipment using these fluids as a power source and/or coolant.

Systems according to the present invention include: a reservoir tank designed for holding diesel fuel or hydraulic oil; a mounting means positioned across an opening in a top portion of the reservoir tank; heat exchange conduit means extending through and attached to the mounting means; temperature sensing means located within the reservoir tank to sense the temperature of the fluid contents therein; actuator means positioned in cooperation with the temperature sensing means to permit control of a heat exchange medium flow; and, manifold means attached to the actuator means and the heat exchange conduit. Preferably, control systems according to this invention are connected via conduit means with a diesel engine coolant system. It will be understood from the detailed descriptions herein that the control system of the present invention is particularly well adapted for this and other configurations.

A system according to the present invention for controlling the heating of a diesel fuel in a diesel engine in order to prevent diesel engine control electronic damage comprises: a fuel tank for holding diesel fuel, the fuel tank having top, bottom and side portions, and an access opening formed through the top portion thereof; a heat exchange conduit, constructed and arranged to provide flow-through communication of a heated coolant liquid from an inlet section to an outlet section; a mounting plate extending over the access opening and being attached to the top portion of the fuel tank, upper ends of the inlet section and the outlet section of the heat exchange conduit each passing through and being attached to a hole in the mounting plate; temperature responsive actuator means for regulating the flow of the heated coolant liquid into the heat exchange conduit, the actuator means including an actuator mechanism and a manifold means; conduit means for connecting the actuator means to a diesel engine water manifold and engine block, so that heated coolant liquid in the diesel engine is passed through the heat exchange conduit to heat the diesel fuel contained in the fuel tank when the diesel fuel is at or below a predetermined temperature range.

For preferred embodiments, the actuator mechanism comprises: an elongate rigid tubing; fuel temperature sensing means; a positioning bar; bypass means; and, biasing means. The elongate rigid tubing includes a closed first end section which extends downwardly through the mounting plate into the fuel tank. An upper second end section extends externally through and is attached to a hole in the mounting plate. The fuel temperature sensing means is located in the tubing closed first end section. This fuel temperature sensing means permits temperature responsive vertically oriented movement of a piston element. A positioning bar is constructed and arranged for placement in the rigid tubing with a first end positioned on the piston element and an oppositely disposed second end being proximate to the externally extending upper second end section of the rigid tubing. This positioning bar is designed to move axially within the rigid tubing in cooperation with movement of the piston element between a first and second position. A biasing means for biasing the positioning bar toward the first position is provided.

In operation, the temperature sensing means detects the temperature of the fluid in the tank. When a predetermined temperature of the fluid is detected, a thermally responsive material in the temperature sensing means imparts vertical movement to the piston element. This vertical movement moves the positioning bar axially within the actuator mechanism rigid tubing. As the positioning bar moves vertically upwardly, bypass means located on the positioning bar second end obstruct the flow of heat exchange medium into the heat exchange conduits, and bypass the flow of the heat exchange medium through a bypass chamber. Thus, as the predetermined temperature range of the fluid in the tank is reached, a control system according to this invention restricts and ultimately prevents further flow of heat exchange medium into the tank heat exchange conduits. Accordingly, the additional heating effect of a heat exchange medium is not added to the fluid in the tank and thereby protects the diesel engine electronic components from residual heat damage which may otherwise be imparted to the engine by diesel fuel having too great a temperature.

As disclosed in greater detail in the accompanying description and drawings, a similar heat exchange medium bypass is effected for systems utilizing hydraulic oil in reservoir tanks. In such applications, the predetermined temperature ranges may differ from those desired in association with diesel fuel. However, the device of the present invention is constructed substantially the same in either application.

Preferred embodiments of devices according to the present invention include a heat exchange conduit comprised of a length of rigid tubing passing into and out of a fuel tank through the access opening. The rigid tubing preferably includes an inlet section and an outlet section which are interconnected to one another and which extend generally parallel to one another. These inlet and outlet sections each include a first portion which extends generally downwardly into the fuel tank and a second portion which extends transverse thereto and substantially adjacent to the bottom portion of the fuel tank. A similar arrangement is constructed for operation with hydraulic oil tanks.

Preferred embodiments of this invention include conduit means for connecting the actuator means to a diesel engine. The conduit means include an intake conduit having a first end connected in fluid communication to the intake section of the actuator means and a second end connected in fluid communication with a water manifold of a diesel engine. A discharge conduit having a first end connected to the discharge section of the actuator means is also provided, as well as a second end connected to the engine block of the diesel engine. Therefore, the heated coolant liquid in the diesel engine is passed through the conduit means the actuator means, and the heat exchange conduit to heat the diesel fuel contained in the fuel tank. Preferred embodiments may also include an independent water heater and pump interposed in fluid communication with the intake conduit between the actuator means and the water manifold. Further, a system according to the present invention may also include means for warming diesel fuel as it is drawn into the diesel engine. Such warming means include: a substantially vertically oriented length of rigid tubing passing into and out of the fuel tank through the access opening. The tubing includes an upper inlet section extending through and attached to a hole in the mounting plate, and a lower outlet section extending generally downward into the fuel tank. The upper inlet section is constructed and arranged for discharge of diesel fuel for passage through a fuel line into the diesel engine.

A preferred mounting plate comprises two backing plates constructed and arranged for mounting within the fuel tank top portion across the access opening; an external plate constructed and arranged for mounting on top of the fuel tank top portion across the access opening; and, the external plate includes means for gripping the backing plate to provide secure mounting of the mounting plate on the fuel tank. Additional attaching means may include bolts, nuts, washers, clips, and gasket means.

A manifold means according to the present invention is attached to the actuator mechanism and the heat exchange conduit. A preferred manifold means comprises a body section having a top portion, a bottom portion, and side portions. The bottom portion may include three apertures which ar designed to receive heat exchange conduit inlet sections and outlet sections, as well as the actuator mechanism upper section. The manifold means side portions include apertures which permit receipt of the conduit means intake conduit and discharge conduit. A body section of a preferred manifold means includes internal chambers which allow selective flow of a heat exchange medium therethrough. Thus, when the actuator mechanism positioning bar is in the first position, the manifold means permits flow of heat exchange medium through the intake conduit into the heat exchange conduit and through the discharge conduit. Alternatively, when the actuator mechanism positioning bar is in the second position, the preferred manifold means permits flow of the heat exchange medium only through the intake conduit, the manifold internal chambers, and the discharge conduit. Therefore, when the actuator mechanism positioning bar is in the second position, a heated coolant liquid is bypassed and prevented from flowing through the heat exchange conduit in diesel or hydraulic reservoir tanks.

A preferred bypass means includes a bypass cap which is positioned between the actuator mechanism positioning bar second end and a biasing means. A preferred bypass cap permits flow-through communication of heat exchange medium from the intake conduit to the discharge conduit when the positioning bar is in the second position. Other bypass means include: a positioning bar having an aperture extending through the second end; a positioning bar and cap combination which is constructed to prevent flow of heat exchange medium into the heat exchange conduit when the positioning bar is in the first position; a positioning bar with a plurality of apertures constructed and arranged for aligned cooperation with internal chamber openings; as well as various other configurations.

An optimum predetermined range for temperatures sensing means according to the present invention for use with diesel fuel tank operations is generally between about 52° Fahrenheit and about 80° Fahrenheit. However, if additional cooling is desired, alternate or additional temperature sensing means and devices may be installed. For example, an alternate embodiment may permit additional coolant flow through heat exchange conduits in a diesel tank when diesel fuel temperatures in a reservoir tank are in a range of between about 90° F. and about 112° F. In such a configuration, it may be desirable to construct a positioning bar and bypass means permitting the coolant flow from a refrigerated coolant loop to normally bypass the heat exchange conduits until the temperature sensing means actuates the positioning bar. Yet other embodiments may include hydraulic oil reservoir tank operations. Actuator means and conduit means according to the present invention may also be covered with a flexible heat insulating material to prevent heat dissipation at the manifold means during cold weather operations The drawings constitute a part of this specification and include exemplary embodiments with the present invention, while illustrating various objects and features thereof. It will be understood in some instances relative material thicknesses and relative component sizes and dimensions may be shown exaggerated, to facilitate an understanding of the invention.

As required, detailed embodiments of the present invention are disclosed herein. It is to be understood, however, that the disclosed embodiments are merely exemplary of the invention, which may be embodied in various forms. Therefore, specific structural and functional detail disclosed herein are not to be interpreted as limiting, but rather as a basis for the claims and as a representative basis for teaching one skilled in the art to variously employ the present invention in virtually any appropriately detailed system or structure.

Figures 1, 2:
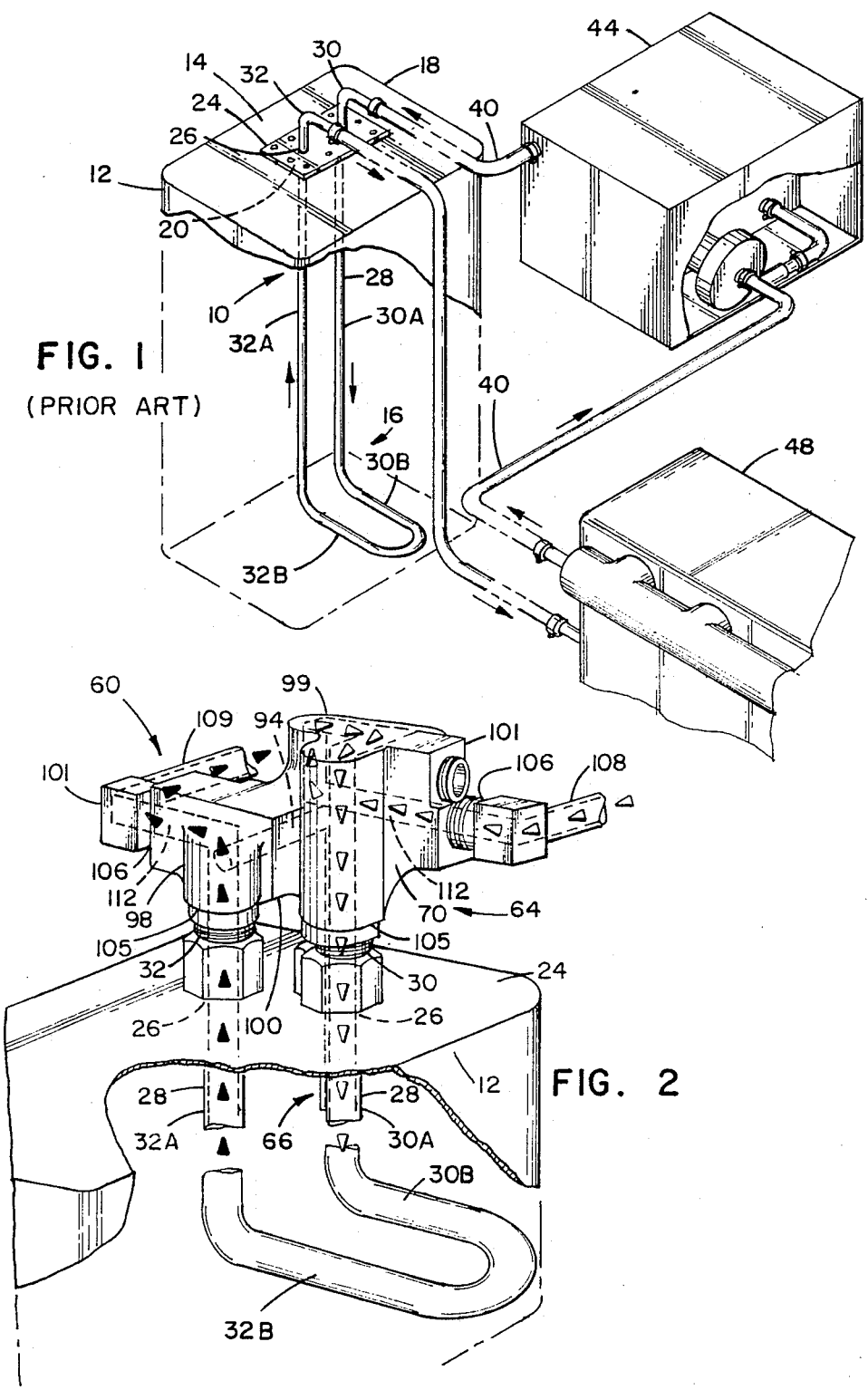
FIG. 1 is an enlarged perspective view, partially broken away, which schematically illustrates a device in accordance with the present invention utilized with a preheater device; this figure being analogous to the prior art device illustrated in U.S. Pat. No. 4,237,850.
FIG. 2 is a perspective illustration of a preferred in-tank heater with manifold means and actuator means attached.

Referring to FIG. 1, the reference numeral 10 generally designates an in-tank heat exchange device according to the prior art as illustrated in U.S. Pat. No. 4,237,850. The prior art device includes a fuel tank 12 for holding diesel fuel. Fuel tank 12 includes a top portion 14, a bottom portion 16, and side portions 18. Fuel tank 12 also includes an access opening 20, preferably located in top portion 14. A mounting plate 24 extends over access opening 20 and is attached to top portion 14 of fuel tank 12. Apertures 26 permit placement of a heat exchange conduit 28 into fuel tank 12. Heat exchange conduit 28 is constructed and arranged to provide flow-through communication of a heated coolant liquid therethrough. Heat exchange conduit 28 is comprised of a length of rigid tubing passing into and out of fuel tank 12 through access opening 20. The rigid tubing includes an inlet section 30 and an outlet section 32 interconnected to one another extending generally parallel to one another. Inlet section 30 and outlet section 32 each include first portions 30A, 32A extending generally downward into fuel tank 12 and second portions 30B, 32B transverse thereto and extending adjacent bottom portion 16 of fuel tank 12.

As shown in FIG. 1, conduit means 40 is provided for connecting heat exchange conduit 28 to a pre-heater type of heating device 44 and a diesel engine 48. In operation, device 10 permits heated coolant flow through diesel engine 48, heating device 44, conduit means 40, and heat exchange conduit 28 to provide in-tank heating of diesel fuel in fuel tank 12.

FIG. 2 illustrates a preferred flow control device 60 for cooperative use with device 10 or other similar flow devices. Control device 60 is also constructed for use in a fuel tank 12 or other reservoir tank such as may be constructed for holding hydraulic oil. A mounting plate 24 includes a plurality of apertures 26 through which extends heat exchange conduit 28 and actuator means 64. Heat exchange conduit 28 includes a portion within device 60 in the form of a flow chamber and may also refer to extension tubes in the form of conduit inlet section 30 and conduit outlet section 32. Heat exchange conduit inlet section 30 includes first portion 30A extending downwardly into fuel tank 12 and second portion 30B extending generally transversely proximate bottom portion 16 of fuel tank 12. Heat exchange conduit outlet section 32 includes first portion 32A extending downwardly into fuel tank 12, and second portion 32B extending generally transversely proximate bottom portion 16 of fuel tank 12. It should be appreciated that transverse second portions 30b and 32b may comprise a portion transverse to the bottom of the tank or reservoir while merely extending between heat exchange conduit inlet section first portion 50a and second portion 32a without having a protruding foot like appearance.

Figure 4:
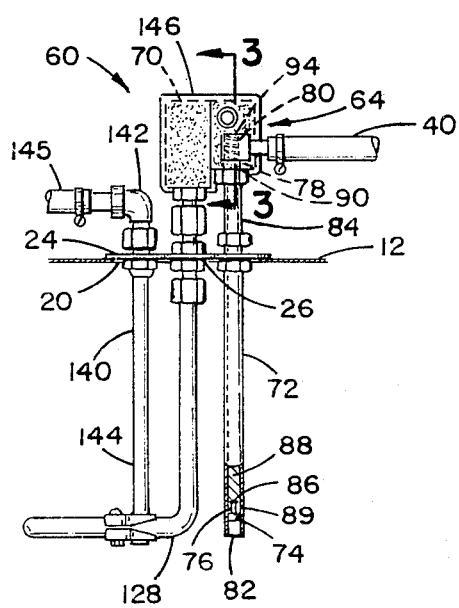
FIG. 4 is a perspective view illustrating an alternate embodiment device according to the present invention including a rigid tubing for heating or cooling diesel fuel while filling a diesel diesel fuel reservoir tank.

Actuator means 64 provides regulation of the flow of a heat exchange medium, preferably a heated coolant liquid, into heat exchange conduit 28. Preferably, as shown in FIG. 4, actuator means 64 includes an actuator mechanism 66 and manifold means 70. A preferred actuator mechanism 66 includes an elongate rigid tubing 72, fuel temperature sensing means 74, positioning means 76, bypass means 78, and biasing means 80. Elongate rigid tubing 72 preferably includes a closed first end section 82 which extends into fuel tank 12, and an upper second end section 84 extending through and attached to aperture 26 in mounting plate 24. Fuel temperature sensing means located in closed first end section 82 permits temperature responsive vertically oriented movement of a piston element 86. A preferred fuel temperature sensing means is a thermostatic actuator manufactured under the name "Power Pill ®". As will be further detailed later in this specification, fuel temperature sensing means 74 may be set for response to various temperature ranges according to the application desired.

Positioning means 76 is preferably comprised of a positioning bar 88 constructed and arranged for placement in elongate rigid tubing 72. Positioning bar 88 includes a first end 89 which is operationally located on top of piston element 86. Positioning bar 88 also includes second end 90 oppositely disposed from first end 89. Positioning bar 88 is positioned in elongate rigid tubing 72 so that positioning bar 88 may move axially therein in cooperation with the movement of piston element 86 as fuel temperature sensing means 74 responds to any predetermined temperature ranges of fuel temperature in tank 12.

In operation, when the diesel fuel achieves temperatures in a predetermined range, piston element 86 moves vertically upwardly until the maximum response temperature is reached. At that time, piston element 86 completes its vertical stroke movement and has caused positioning bar 88 to also move vertically within elongate rigid tubing 72. As positioning bar 88 moves vertically upwardly in response to the movement of piston element 86, bypass means 78, located on positioning bar second end 90, bypasses flow of a heat exchange medium in manifold means 70. In preferred device 60, the upward movement of positioning bar 88 causes bypass means 78 to restrict flow of heated coolant liquid into heat exchange conduit 28. As this flow of heated coolant liquid into heat exchange conduit 28 is restricted, bypass means 78 permits that flow to pass through bypass conduit 94 in manifold means 70. Thus, as diesel fuel in fuel tank 12 is warmed, device 60 provides mechanically operated automatic bypassing of the heat exchange medium to prevent further heat from being added by that medium to the tank contents. In this way, the risk of overheating diesel engine electronic control components is significantly reduced. Moreover, optimum temperatures may be more readily achieved for maintaining proper power values of the diesel fuel.

FIG. 2 illustrates a preferred manifold means 70 including a body section 98 having a top portion 99, a bottom portion 100, and side portions 101. Preferred manifold means 70 is of very small size so as to provide great ease in installation. For example, preferred manifold means 70 for many truck applications must be placed in very crowded mechanical environments. Thus, a design height of approximately 3.5 inches or less is preferred. Manifold means bottom portion 100 preferably includes three apertures 105 which are constructed and arranged for receipt of heat exchange conduit inlet section 30 and outlet section 32, as well as actuator mechanism 66. Manifold means side portions 101 also include apertures 106 which are designed for receipt of a conduit means intake conduit 108 and a discharge conduit 109. The manifold means body section 98 includes internal chambers 112 which permit selective flow of heat exchange medium therethrough. When actuator mechanism positioning bar 88 is at its first, lowest position, manifold means 70 allows flow of the heat exchange medium through intake conduit 108, into heat exchange conduit 28, and through discharge conduit 109. However, when actuator mechanism positioning bar 88 is in the second, raised position, manifold means 70 allows flow of the heat exchange medium only through intake conduit 108, bypass conduit 94, and discharge conduit 109; thereby preventing flow of heat exchange medium through heat exchange conduit 28. Accordingly, bypassed heated coolant liquid will not act as a heat sink for any diesel fuel in fuel tank 12 which is at a higher temperature. This prevents the heated coolant liquid from imparting such added heat to diesel engine 48 and any associated electronic components during return loop operation of the heated coolant liquid through diesel engine 48.

Figure 3A:
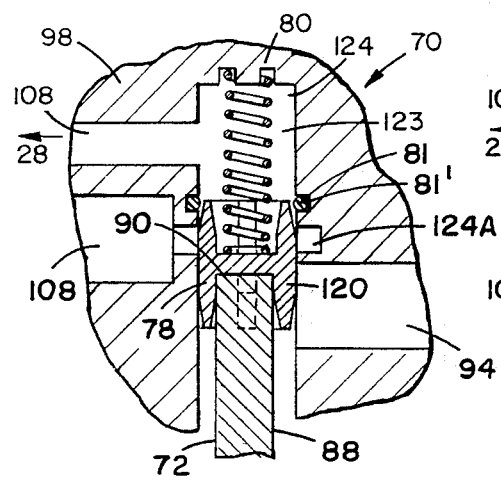
FIG. 3A is a side cross-sectional view illustrating a preferred bypass means including a positioning bar and bypass cap combination; the bypass means being shown in a flow-through position permitting heat exchange medium to enter heat exchange conduits.
Figure 3B:
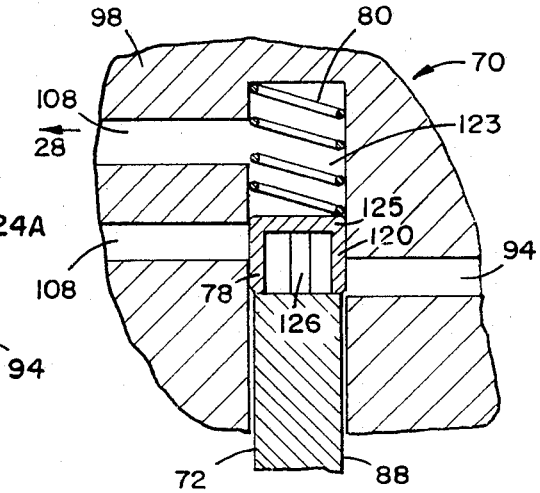
FIG. 3B is a side cross-sectional view, generally analogous to FIG. 3A, illustrating a bypass means in the bypass configuration permitting heat exchange medium flow only through a bypass chamber.

FIG. 3A illustrates an enlarged crosssectional view of preferred bypass means 78 in device 60. According to the present invention, elongate rigid tubing 72 forms the portion of actuator mechanism 66 extending into fuel tank 12. Positioning bar 88 is axially located within elongate rigid tubing 72. Preferably, bypass means 78 includes a bypass cap 120 located on positioning bar second end 90. Bypass cap 120 is, preferably, constructed in a cylindrical shape substantially conformal with the inner diameter or dimensions of elongate rigid tubing 72 and actuator mechanism chamber 123 in manifold means 70 as shown in FIG. 3A, a preferred bypass cap 120 comprises a central portion 121 constructed and arranged for resting on positioning bar second end 90. Bypass cap 120 also comprises support members 126 which may project from both sides of central portion 121 (as in FIG. 3A) or merely from one side of central portion 121 (as shown in FIG. 3B). Bypass cap 120, shown in FIG. 3B, includes an upper portion 125 designed to prevent fluid passage thereby and a plurality of support members 126 arranged for supporting bypass cap 120 on positioning bar 88 second end 90. Apertures 128 are located between support members 126 and permit selective fluid flow therethrough. Biasing means 80, preferably in the form of a spring mechanism, is positioned between actuator mechanism chamber upper end 124 and positioning bar second end 90. As shown in FIG. 3A, bypass cap 120 may be intermediately positioned between biasing means 80 and positioning bar second end 90 with upper projecting support members 126 supporting and centering biasing means 80. Biasing means 80 imparts a biasing force in a direction generally opposite that of the direction of the maximum temperature response stroke of piston element 86. In operation, the force of piston element 86 during a maximum temperature response stroke is sufficient to overcome the opposite biasing force of biasing means 80. As illustrated in FIG. 2, FIG. 3A, FIG. 3B and FIG. 4, a preferred embodiment of device 60 provides for bypass cap central portion 121 to be positioned in blocking relationship with bypass conduit 94. This position coincides with positioning bar 88 being in the first, lower position, and heated coolant flow passing through conduit means intake conduit 108, through heat exchange conduit 28, and out of manifold means 70 through discharge conduit 109.

As illustrated in FIG. 3A, movement of positioning bar 88 in a vertical direction will cause bypass cap 120 central portion 121 to seal off coolant medium flow from entering heat exchange conduit 28 and will cause said flow to exit through bypass conduit 94 instead. Biasing means O-ring seal 81, located in ring groove or cutout portion 81', assists in maintaining complete fluid bypass and prevents flow of unwanted coolant medium therepast during the bypass mode of operation. This assures that no additional heat exchange will occur when temperatures of the medium in a reservoir tank, such as diesel fuel or hydraulic oil, are at predetermined desired temperatures. Also, actuator mechanism chamber upper end groove 124a provides an expanded area of flow proximate bypass means 78 so that there is no significant coolant flow pressure or temperature changes due to restriction. This is particularly important in the bypass mode of operation.

As illustrated in FIG. 3B, bypass means 78 is moved vertically within actuator mechanism chamber 123 as positioning bar 88 moves from a first lowered position to a second raised position. As illustrated in FIG. 3B, upper portion 125 of bypass cap 120 is repositioned in blocking relationship within a portion of intake conduit 108 leading to heat exchange conduit 28; thereby causing heated coolant liquid flow to bypass heat exchange conduit 28 and flow through bypass conduit 94 instead. Biasing means 80 prevents dislodging of bypass cap 120 by any flow turbulence or pressure caused by heated coolant liquid. Moreover, the length and shape of support members 126 prevent misalignment of bypass cap 120 within actuator member chamber 123. Another embodiment of bypass means 78 includes a positioning bar 88 having an aperture extending therethrough proximate positioning bar second end 90; the aperture allowing flow-through communication of heated coolant liquid, or other heat exchange medium, from intake conduit 108 into bypass conduit 94 and discharge conduit 109. Movement and/or construction of bypass means 78 is dependent on various factors including length of piston element 86, length of stroke of piston element 86, length of positioning bar 88, and orientation of bypass conduit 94 to positioning bar second end 90.

Figure 3C:
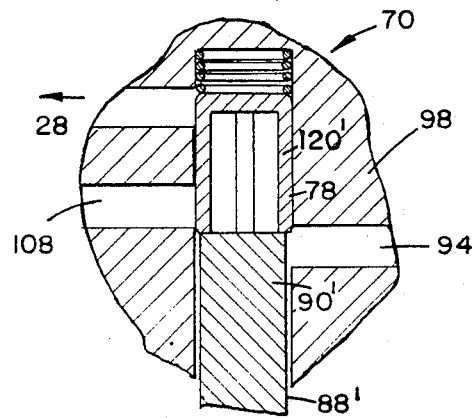
FIG. 3C is a side cross-sectional view, generally analogous to FIG. 3A, illustrating an alternate embodiment bypass means in which the normal flow is a bypassed flow.

FIG. 3C illustrates yet another embodiment of bypass means 78. Positioning bar 88' and bypass cap 120' are constructed and arranged to permit flow of a heat exchange medium through bypass conduit 94 when positioning bar 88' is in the first, lowered position. As illustrated, when positioning bar 88' is moved to a raised, second position, positioning bar second end 90' blocks bypass conduit 94 and bypass cap 120' permits heat exchange medium flow to resume through intake conduit 108, heat exchange conduit 28, and discharge conduit 109. This alternate embodiment bypass means 78 may be particularly useful when device 60 is configured to provide a heat exchange medium to a fuel tank or hydraulic oil reservoir tank in order to cool substantially hot fuel oil or hydraulic oil therein.

FIG. 4 illustrates a preferred device 60 including means for warming or cooling the fuel oil that is being drawn from a reservoir tank into a diesel engine fuel line. More particularly, a substantially vertically oriented rigid tubing 140 is provided passing into and out of fuel tank 12 through access opening 20. Rigid tubing 140 includes an upper inlet section 142 extending through and being attached to aperture 26 in mounting plate 24, and a lower outlet section 144 extending generally downward into fuel tank 12. Thus, the placement of rigid tubing 140 permits heat exchange with heat exchange conduit 28 to heat or cool liquid which is passing through rigid tubing 140 and into fuel line 145 leading to diesel engine 48.

FIG. 4 also illustrates use of a heat insulating flexible material 146 which may be placed around actuator means 64 and/or conduit means 40 to prevent unnecessary heat loss from device 60 in cold weather operation. Insulating material 146 facilitates heat preservation within device 60 by: preventing heat loss from heated coolant liquid; neutralizing windchill effects; and preventing chafing and wear of conduit means 50. FIG. 4, line 3—3, illustrates the general orientation of FIGS. 3A, 3B, 3C.

Figure 5:
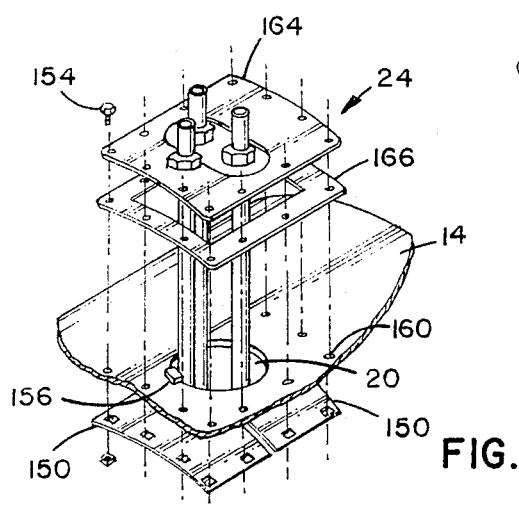
FIG. 5 is an exploded perspective view of a preferred mounting plate.

As illustrated in FIG. 5, mounting plate 24 preferably comprises a plurality of backing plates 150, preferably two, which are constructed and arranged for mounting within fuel tank top portion 14. Backing plates 150 are constructed to facilitate installation of and to reinforce, mounting plate 24 by: providing plates which are readily inserted through access opening 20 and which conform to the generally circular shape of access opening 20; providing additional threaded area for anchoring means 154; and providing additional material for reinforcement and torquing. Backing plates 150 are designed to be inserted through access opening 20 and retained by at least one generally C-shaped retaining clip 156 having barbed inner surfaces for gripping fuel tank 12 top portion 14 and backing plates 150. Backing plates 150 mounted by retaining clips 156 greatly facilitate the alignment of mounting holes 160 in top portion 14 for installation of external plate 164 and anchoring means 154. Further, backing plates 150 provide means for alternate gripping for anchoring means 154 in the event of a bad tap around any mounting holes 160. Anchoring means 154 includes hexagonal-head screws and cage nuts for strength relatively greater than self-tapping fastening means.

External plate 164 is designed for mounting on top of fuel tank top portion 14 across access opening 20 in substantially oppositely disposed relation to backing plates 150. Preferably, gasket 166 is positioned between external plate 164 and tank top portion 14. As illustrated, external plate 164 includes anchoring means 154 to provide secure attachment of mounting plate 24 onto fuel tank 12. Device 60, including mounting plate 24, is interchangeably operable on either fuel tank 12 or a hydraulic oil reservoir tank.

The invention accordingly consists in the features of the construction, combinations of elements, and construction of parts which will be exemplified in the construction described above and of which the scope of the invention would be indicated in the following claims. It is to be understood that while certain embodiments of the present invention have been illustrated and described, the invention is not to be limited to these specific forms or arrangements of parts herein described an shown.

What is claimed is:

1. A system for controlling the flow of a heat exchange medium within a heat exchange conduit positioned in a reservoir tank for containing liquids; said control system being mounted across an access opening in a top portion of said reservoir tank, and said control system comprising:
    (a) mounting means for securely positioning said heat exchange control system across an access opening in a reservoir tank for liquids;
    (b) a heat exchange conduit flow being controlled by said heat exchange control system for permitting heat exchange within said reservoir tank; said heat exchange conduit comprising a length of rigid tubing passing into and out of said reservoir tank through said access opening, said rigid tubing including an inlet section and an outlet section interconnected to one another and extending generally parallel to one another, said inlet and outlet sections each including a first portion extending generally downward into said reservoir tank and a second portion transverse thereto and extending adjacent a bottom portion of said reservoir tank;
    (c) temperature sensing means for sensing temperature of liquid within said reservoir tank;
    (d) bypass means for selectively admitting flow of heat exchange medium into said heat exchange conduit, said bypass means responsive to said temperature sensing means for admitting flow of heat exchange medium to said heat exchange conduit when sensed temperature is at a predetermined minimum value and alternatively bypassing said heat exchange conduit when said temperature exceeds a predetermined maximum value;
    (e) conduit means for connecting said heat exchange conduit and said bypass means in fluid communication with a heat exchange medium source, said conduit means including an intake conduit and a discharge conduit;
    (f) an elongate rigid tube having a closed first end section extending downwardly into said reservoir tank from said access opening, and an upper second end section extending through said access opening and an aperture in said mounting means; said temperature sensing means being fixedly located in said elongate tube closed first end section and comprising therein temperature-responsive piston means having a movable piston element; said elongate rigid tube also containing a positioning bar constructed and arranged with a first end located on said movable piston element, and an oppositely disposed second end; said positioning bar moving axially within said rigid tubing between first and second positions in response to piston element movement;

(g) biasing means providing biasing force against said bypass means and positioning bar second end so that said bypass means admits flow of heat exchange medium into said heat exchange conduit in response to movement of said positioning bar between said first and second positions;

(h) manifold means having a body section with a top portion, a bottom portion, and side portions:
  (i) said bottom portion including three apertures therein constructed and arranged for receipt of said heat exchange conduit inlet section and outlet section, and for receipt of a portion of said elongate rigid tube;
  (ii) said side portions including apertures therein constructed and arranged for receipt of said conduit means intake conduit and discharge conduit;
  (iii) said body section having internal chambers permitting selective flow of said heat exchange medium therethrough;

(i) wherein when said positioning bar is in said first position said bypass means and manifold means permit flow of said heat exchange medium only through said intake conduit, said manifold internal chambers, and said discharge conduit, and when said positioning bar is in said second position said bypass means and manifold means permits flow of said heat exchange medium through said intake conduit into said heat exchange conduit and through said discharge conduit.

2. A system according to claim 1 including an independent pump interposed in fluid communication with said intake conduit between said intake conduit and said heat exchange medium source.

3. A system according to claim 1 wherein said bypass means includes an aperture extending radially therethrough; said aperture permitting flow-through communication of heat exchange medium from said intake conduit to said discharge conduit when said positioning bar is in said first position.

4. A system according to claim 1 wherein said bypass means includes a bypass cap located between said positioning bar second end and said biasing means; said bypass cap permitting flow-through communication of heat exchange medium from said intake conduit to said discharge conduit while blocking flow to said heat exchange conduit when said positioning bar is in said first position.

5. A system according to claim 1 further comprising liquid discharge means comprising:
  (a) a substantially vertically oriented length of rigid tubing passing into and out of said reservoir tank proximate said heat exchange conduit through said access opening, said rigid tubing including an upper inlet section extending through an aperture in and being attached to said mounting means, and a lower outlet section extending generally downward into said reservoir tank;
  (b) said upper inlet section being constructed and arranged for discharge of liquids from said tank; and
  (c) said liquid discharge means rigid tubing being in close proximity to said heat exchange conduit permits heat exchange between said heat exchange conduit and said liquids passing through said rigid tubing.

6. A system according to claim 1 wherein said bypass means permits full flow of heat exchange medium through said heat exchange conduit when the temperature of liquid in said reservoir tank is below a temperature of about 80° F.

7. A system according to claim 1 wherein said bypass means permits partial flow of heat exchange medium through said heat exchange conduit when the temperature of liquid in said reservoir tank is at a temperature between about 80° F. and about 100° F.

8. A system according claim 1 wherein said bypass means permits flow of heat exchange medium through said heat exchange conduit when the temperature of liquid in said reservoir tank is at a temperature between about 150° F. and about 172° F.

9. A system according to claim 1 wherein said manifold means body section internal chambers comprise an upper end region having sidewalls comprising an upper end groove extending therein, said upper end groove providing increased flow area for a coolant medium in said manifold means.

10. A system according to claim 1 wherein said manifold means body section internal chambers comprise an upper end region having sidewalls comprising a cutout portion, said cutout portion being constructed and arranged for receipt of sealing means therein to prevent coolant flow medium from entering said heat exchange conduit when said positioning bar is in said first position.

11. A system according to claim 10 wherein said sealing means comprises an O-ring.

12. A system for controlling the heating of diesel fuel in a diesel fuel tank to prevent diesel engine control electronics damage comprising:
  (a) a fuel tank for holding diesel fuel, said fuel tank having top, bottom and side portions, and an access opening formed through said top portion of said fuel tank;
  (b) a heat exchange conduit, constructed and arranged to provide flow-through communication of heated coolant liquid, said heat exchange conduit comprised of a length of rigid tubing passing into and out of said fuel tank through said access opening, said rigid tubing including an inlet section and an outlet section interconnected to one another and extending generally parallel to one another, said inlet and outlet sections each including a first portion extending generally downward into said fuel tank and a second portion transverse thereto and extending adjacent a bottom portion of said fuel tank;
  (c) a mounting plate extending across said access opening and being attached to the top portion of said fuel tank, and an upper end of said inlet section and said outlet section of said rigid tubing each passing through an aperture in and being attached to said mounting plate;
  (d) temperature responsive actuator means for regulating the flow of said heated coolant liquid into said heat exchange conduit; said actuator means comprising:
    (i) an actuator mechanism comprising:
      (a) an elongate rigid tubing having a closed first end section extending downwardly into said fuel tank and an upper second end section extending through an aperture in and attached to said mounting plate;
      (b) fuel temperature sensing means fixedly located in said tubing closed first end section; said fuel temperature sending means permitting temperature-responsive vertically oriented movement of a piston element;

(c) a positioning bar constructed and arranged for placement in said rigid tubing; said positioning bar having a first end positioned on said piston element and an oppositely disposed second end; said positioning bar moving axially within said rigid tubing in response to said piston element movement between first and second positions;

(d) bypass means located on said positioning bar second end permitting selective flow of heated coolant liquid from said diesel engine into said heat exchange conduit to heat diesel fuel in said fuel tank when said diesel fuel is at or below a predetermined temperature responsive to movement of said positioning bar between said first and second positions;

(e) biasing means biasing said bypass means and said positioning bar second end downwardly;

(ii) manifold means; said manifold means being attached to said actuator mechanism and said heat exchange conduit;

(e) conduit means for connecting said actuator means to said diesel engine, said conduit means including an intake conduit having a first end connected in fluid communication to an intake section of said actuator means, and a second end connected in fluid communication with a water manifold of said diesel engine; and, a discharge conduit having a first end connected to a discharge section of said actuator means and a second end connected to an engine block of said diesel engine.

13. A system according to claim 12 including an independent water heater and pump interposed in fluid communication with said intake conduit between said actuator means and said diesel engine water manifold.

14. A system according to claim 12 further comprising fuel discharge means comprising:
(a) a substantially vertically oriented length of rigid tubing passing into and out of said fuel tank proximate said heat exchange conduit through said access opening, said rigid tubing including an upper inlet section extending through an aperture in and being attached to said mounting means, and a lower outlet section extending generally downward into said fuel tank;
(b) said upper inlet section being constructed and arranged for discharge of diesel fuel into a fuel line for passage to said diesel engine;
(c) said fuel discharge means rigid tubing being in close proximity to said heat exchange conduit permits heat exchange from said heat exchange conduit to heat fuel passing through said rigid tubing.

15. A system according to claim 12 wherein said mounting plate comprises:
(a) a plurality of backing plates constructed and arranged for mounting within said fuel tank across said access opening;
(b) an external plate constructed and arranged for mounting on top of said fuel tank top portion across said access opening;
(c) said external plate including means for anchoring said backing plates to provide secure attachment of said mounting plate on said fuel tank.

16. A system according to claim 12 wherein said bypass means comprises an aperture extending radially therethrough; said aperture permitting flow-through communication of heated coolant liquid from said intake conduit to said discharge conduit when said positioning bar is in said second position.

17. A system according to claim 12 wherein said bypass means includes a bypass cap located between said positioning bar second end and said biasing means; said bypass cap permitting flow-through communication of heated coolant liquid from said intake conduit to said discharge conduit while blocking flow to said heat exchange conduit when said positioning bar is in said second position.

18. A system according to claim 12 wherein said predetermined temperature is a temperature of about 100° F.

19. A system according to claim 12 wherein a portion of said actuator means external to said fuel tank is removeably covered by a heat insulating flexible material.

20. A system for controlling the heating of a diesel fuel tank to prevent diesel engine control electronics damage comprising:
(a) a fuel tank for holding diesel fuel, said fuel tank having top, bottom and side portions, and an access opening formed through said top portion of said fuel tank;
(b) a heat exchange conduit, constructed and arranged to provide flow-through communication of heated coolant liquid, said heat exchange conduit comprised of a length of rigid tubing passing into and out of said fuel tank through said access opening, said rigid tubing including an inlet section and an outlet section interconnected to one another and extending generally parallel to one another, said inlet and outlet sections each including a first portion extending generally downward into said fuel tank and a second portion transverse thereto and extending adjacent a bottom portion of said fuel tank;
(c) a mounting plate extending across said access opening and being attached to the top portion of said fuel tank, an upper end of said inlet section and said outlet section of said rigid tubing each passing through an aperture in and being attached to said mounting plate;
(d) temperature responsive actuator means for regulating the flow of said heated coolant liquid into said heat exchange conduit; said actuator means comprising:
(i) an actuator mechanism comprising:
(a) an elongate rigid tubing having a closed first end section extending downwardly into said fuel tank and an upper second end section extending through an aperture in and attached to said mounting plate;
(b) fuel temperature sensing means fixedly located in said tubing closed first end section; said fuel temperature sensing means permitting temperature responsive vertically oriented movement of a piston element;
(c) a positioning bar constructed and arranged for placement in said rigid tubing; said positioning bar having a first end positioned in said piston element and an oppositely disposed second end; said positioning bar moving axially within said rigid tubing in response to said piston element movement between first and second positions;

(d) bypass means located on said positioning bar second end permitting selective flow of heated coolant liquid from said diesel engine into said heat exchange conduit to heat diesel fuel in said fuel tank when said diesel fuel is at or below a predetermined temperature responsive to movement of said positioning bar between said first and second positions;

(e) biasing means biasing said bypass means and said positioning bar second end downwardly;

(ii) manifold means; said manifold means being attached to said actuator mechanism and said heat exchange conduit; said manifold means comprising:

(a) a body section having a top portion, a bottom portion, and side portions;

(b) said bottom portion including three apertures therein constructed and arranged for receipt of said exchange conduit inlet section and outlet section and said actuator mechanism;

(c) said side portions including apertures therein constructed and arranged for receipt of a conduit means intake conduit and discharge conduit;

(d) said body section having internal chambers permitting selective flow of said heated coolant liquid therethrough; and (e) conduit means for connecting said actuator means to a diesel engine, said conduit means including:

(i) an intake conduit having a first end connected in fluid communication to an intake section of said actuator means, and a second end connected in fluid communication with a water manifold of said diesel engine; and, (ii) a discharge conduit having a first end connected to a discharge section of said actuator means and a second end connected to an engine block of said diesel engine;

(f) wherein when said actuator mechanism positioning bar is in said first position, said bypass means and manifold means permits flow of said heated coolant liquid through said intake conduit into said heat exchange conduit and through said discharge conduit to provide heat for warming diesel fuel contained in said fuel tank; and when said actuator mechanism positioning bar is in said second position, said bypass means and manifold means permits flow of said heated coolant liquid only through said intake conduit, said manifold internal chambers, and said discharge conduit so that heat exchange between the heated coolant liquid and diesel fuel in said fuel tank does not occur.

21. A system for controlling the heating of hydraulic oil in a hydraulic oil reservoir tank utilizing a heat exchange medium comprising:

(a) a reservoir tank for holding hydraulic oil, said reservoir tank having top, bottom and side portions, and an access opening formed through said top portion thereof;

(b) a heat exchange conduit, constructed and arranged to provide flow-through communication of heated coolant liquid, said heat exchange conduit comprised of a length of rigid tubing passing into and out of said reservoir tank through said access opening, said rigid tubing including an inlet section and an outlet section interconnected to one another and extending generally parallel to one another, said inlet and outlet sections each including a first portion extending generally downward into said reservoir tank and a second portion transverse thereto and extending adjacent said bottom portion of said reservoir tank;

(c) a mounting plate extending across said access opening and being attached to the top portion of said reservoir tank, and an upper end of said inlet section and said outlet section of said rigid tubing each passing through an aperture in and being attached to said mounting plate;

(d) temperature responsive actuator means for regulating the flow of heated coolant liquid into said heat exchange conduit; said actuator means comprising:

(i) an actuator mechanism comprising:

(a) an elongate rigid tubing having a closed first end section extending downwardly into said reservoir tank and an upper second end section extending through an aperture in and attached to said mounting plate;

(b) hydraulic oil temperature sensing means fixedly located in said tubing closed first end section; said hydraulic oil temperature sensing means permitting temperatureresponsive vertically oriented movement of a piston element;

(c) a positioning bar constructed and arranged for placement in said rigid tubing; said positioning bar having a first end positioned on said piston element and an oppositely disposed second end; said positioning bar moving axially within said rigid tubing in response to said piston element movement between first and second positions;

(d) bypass means located on said positioning bar second end permitting selective flow of heated coolant liquid into said heat exchange conduit to heat hydraulic oil in said reservoir tank when said hydraulic oil is at or below a predetermined temperature responsive to movement of said positioning bar between first and second positions;

(e) biasing means biasing said bypass means and said positioning bar second end downwardly;

(ii) manifold means; said manifold means being attached to said actuator mechanism and to said heat exchange conduit;

(e) conduit means for connecting said actuator means to an external heated coolant liquid source, said conduit means including an intake conduit having a first end connected in fluid communication to an intake section of said actuator means, and a second end connected in fluid communication with a liquid supply manifold of said external heated coolant liquid source; and, a discharge conduit having a first end connected to the discharge section of said actuator means and a second end connected to a liquid return manifold of said external heated coolant liquid source.

22. A system according to claim 21 including further independent coolant liquid heater and pump interposed in fluid communication with said intake conduit between said actuator means and said liquid supply manifold.

23. A system according to claim 21 wherein said mounting plate comprises:

(a) a plurality of backing plates constructed and arranged for mounting within said reservoir tank across said access opening;

(b) an external plate constructed and arranged for mounting on top of said reservoir tank top portion across said access opening;

(c) said external plate including means for anchoring said backing plates to provide secure mounting of said mounting plate on said reservoir tank.

24. A system according to claim 21 wherein said predetermined temperature is a temperature of about 60° F.

25. A system according to claim 21 wherein said predetermined temperature is a temperature of about 110° F.

26. A system according to claim 1 wherein said actuator means is removeably covered by a heat insulating flexible material.

27. A system for controlling the heating of hydraulic oil in a hydraulic oil reservoir tank utilizing a heat exchange medium comprising:

(a) a reservoir tank for holding hydraulic oil, said reservoir tank having a top portion, a bottom portion, and side portions, and an access opening extending through said top portion thereof;

(b) a heat exchange conduit, constructed and arranged to provide flow-through communication of heated coolant liquid, said heat exchange conduit comprised of a length of rigid tubing passing into and out of said reservoir tank through said access opening, said rigid tubing including an inlet section and an outlet section interconnected to one another and extending generally parallel to one another, said inlet and outlet sections each including a first portion extending generally downward into said reservoir tank and a second portion transverse thereto and extending adjacent said bottom portion of said reservoir tank;

(c) a mounting plate extending across said access opening and being attached to the top portion of said reservoir tank, and an upper end of said inlet section and said outlet section of said rigid tubing each passing through an aperture in and being attached to said mounting plate;

(d) temperature responsive actuator means for regulating the flow of heated coolant liquid into said heat exchange conduit; said actuator means comprising:

(i) an actuator mechanism comprising:

(a) an elongate rigid tubing having a closed first end section extending downwardly into said fuel tank and an upper second end section extending through an aperture in and attached to said mounting plate;

(b) hydraulic oil temperature sensing means fixedly located in said tubing closed first end section; said hydraulic oil temperature sensing means permitting temperature responsive vertically oriented movement of a piston element;

(c) a positioning bar constructed and arranged for placement in said rigid tubing; said positioning bar having a first end positioned on said piston element and an oppositely disposed second end; said positioning bar moving axially within said rigid tubing in response to said piston element movement between first and second positions;

(d) bypass means located on said positioning bar second end permitting selective flow of heated coolant liquid into said heat exchange conduit to heat hydraulic oil in said hydraulic oil tank when said hydraulic oil is at or below a predetermined temperature responsive to movement of said positioning bar between said first and second positions;

(e) biasing means biasing said bypass means and said positioning bar second end downwardly;

(ii) manifold means; said manifold means being attached to said actuator mechanism and said heat exchange conduit; said manifold means comprising:

(a) a body section having a top portion, a bottom portion, and side portions;

(b) said bottom portion including three apertures therein constructed and arranged for receipt of said heat exchange conduit inlet section and outlet section and said actuator mechanism;

(c) said side portions including apertures therein constructed and arranged for receipt of a conduit means intake conduit and discharge conduit;

(d) said body section having internal chambers permitting selective flow of said heated coolant liquid therethrough; and (e) conduit means for connecting said actuator means to an external heated coolant liquid source, said conduit means including:

(i) an intake conduit having a first end connected in fluid communication to an intake section of said actuator means, and a second end connected in fluid communication with a liquid supply manifold of said external heated coolant liquid source, and, (ii) a discharge conduit having a first end connected to the discharge section of said actuator means and a second end connected to a liquid return manifold of said external heated coolant liquid source;

(f) wherein when said actuator mechanism positioning bar is in said first position, said bypass means and manifold means permits flow of said heated coolant liquid through said intake conduit into said heat exchange conduit and through said discharge conduit; and when said actuator mechanism positioning bar is in said second position, said bypass means and manifold means permits flow of said heated coolant liquid only through said intake conduit, said manifold internal chambers, and said discharge conduit.

28. A system according to claim 21 wherein said bypass means includes an aperture extending through; said aperture permitting flow-through communication of heated coolant liquid from said intake conduit to said discharge conduit when said positioning bar is in said second position.

29. A system according to claim 21 wherein said bypass means includes a bypass cap positioned between said positioning bar second end and said biasing means; said bypass cap permitting flow-through communication of heated coolant liquid from said intake conduit to said discharge conduit while blocking flow to said heat exchange conduit when said positioning bar is in said second position.

30. A system for controlling the flow of heat exchange medium within a heat exchange conduit extension positioned in a reservoir tank for containing liquids; said control system being mounted by mounting means across an access opening in a top portion of said reservoir tank, said control system comprising:

(a) a heat exchange conduit for providing fluid communication between said control system and a heat exchange conduit extension tube extending into and out of a reservoir tank;

(b) temperature sensing means for sensing temperature of liquid within said reservoir tank;

(c) bypass means for selectively admitting flow of heat exchange medium into said heat exchange conduit, said bypass means responsive to said temperature sensing means for admitting flow of heat exchange medium to said heat exchange conduit when sensed temperature is at a predetermined minimum value and alternatively bypassing said heat exchange conduit when said temperature exceeds a predetermined maximum value;

(d) conduit connection means for connecting said heat exchange conduit and said bypass means in fluid communication with a heat exchange medium source, said conduit connection means including an intake conduit connection and a discharge conduit connection;

(e) an elongate tube having a closed first end section extending downwardly into said reservoir tank from said access opening, and an upper second end section extending through said access opening; said temperature sensing means being fixedly located in said elongate tube closed first end section and comprising therein temperature-responsive piston means having a movable piston element; said elongate tube also containing a positioning bar constructed and arranged with a first end located on said movable piston element, and an oppositely disposed second end; said positioning bar moving axially within said tube between first and second positions in response to piston element movement;

(f) biasing means providing biasing force against said bypass means and positioning bar second end so that said bypass means admits flow of heat exchange medium into said heat exchange conduit in response to movement of said positioning bar between said first and second positions;

(g) manifold means having a body section with a top portion, a bottom portion, and side portions;
 (i) said bottom portion including three apertures therein constructed and arranged for providing fluid connection between said heat exchange conduit and heat exchange conduit extension tubes, and for receipt of a portion of said elongate tube;
 (ii) said side portions including apertures therein constructed and arranged for providing fluid flow paths for heat exchange medium entering said manifold means at said intake conduit connection and for exiting said manifold means at said discharge conduit connection;
 (iii) said body section having internal chambers permitting selective flow of said heat exchange medium therethrough;

(h) wherein when said positioning bar is in said first position said bypass means and manifold means permit flow of said heat exchange medium only through said intake conduit connection, said manifold internal chambers, and said discharge conduit connection, and when said positioning bar is in said second positioning said bypass means and manifold means permit flow of said heat exchange medium through said intake conduit connection into said heat exchange conduit and through said discharge conduit connection.

31. A system according to claim 30 wherein:
(a) said positioning bar comprises a first end proximate said piston means piston element and a second end distal said first end; and
(b) said bypass means comprises a bypass cap member operably mounted on said positioning bar second end for selectively permitting flow-through communication of said heat exchange medium from said intake conduit connecting to said discharge conduit connection.

32. A system according to claim 30 further comprising fluid discharge means comprising:
(a) a length of tubing passing into and out of said reservoir tank proximate said heat exchange conduit, said tubing including an upper inlet section extending through an aperture in and being attached to said mounting means, and a lower outlet section extending into said reservoir tank; and
(b) said upper inlet section being constructed and arranged for discharge of fluids from said reservoir tank, said fluid discharge means tubing permitting heat exchange between said heat exchange conduit and said liquids passing through said tubing.

33. A system according to claim 30 wherein said bypass means permits full flow of heat exchange medium through said heat exchange conduit when the temperature of fluid in said reservoir tank is below a temperature of about 80° F.

34. A system according to claim 30 wherein said bypass means permits partial flow of heat exchange medium through said heat exchange conduit when the temperature of fluid in said reservoir tank is at a temperature of between about 80° F. and about 100° F.

35. A system according to claim 30 wherein said bypass means permits flow of heat exchange medium through said heat exchange conduit when the temperature of fluid in said reservoir tank is at a temperature of between about 150° F. and about 172° F.

* * * * *